April 7, 1959 L. B. POPE ET AL 2,880,629
BORING MACHINE WORKTABLE AND SPEED CONTROL THEREFOR
Filed Dec. 19, 1955 4 Sheets-Sheet 1

Inventors
Lyman B. Pope
John W. Sjostrom
Albert H. Kempton
by Wright, Brown,
Quinby May
Attys.

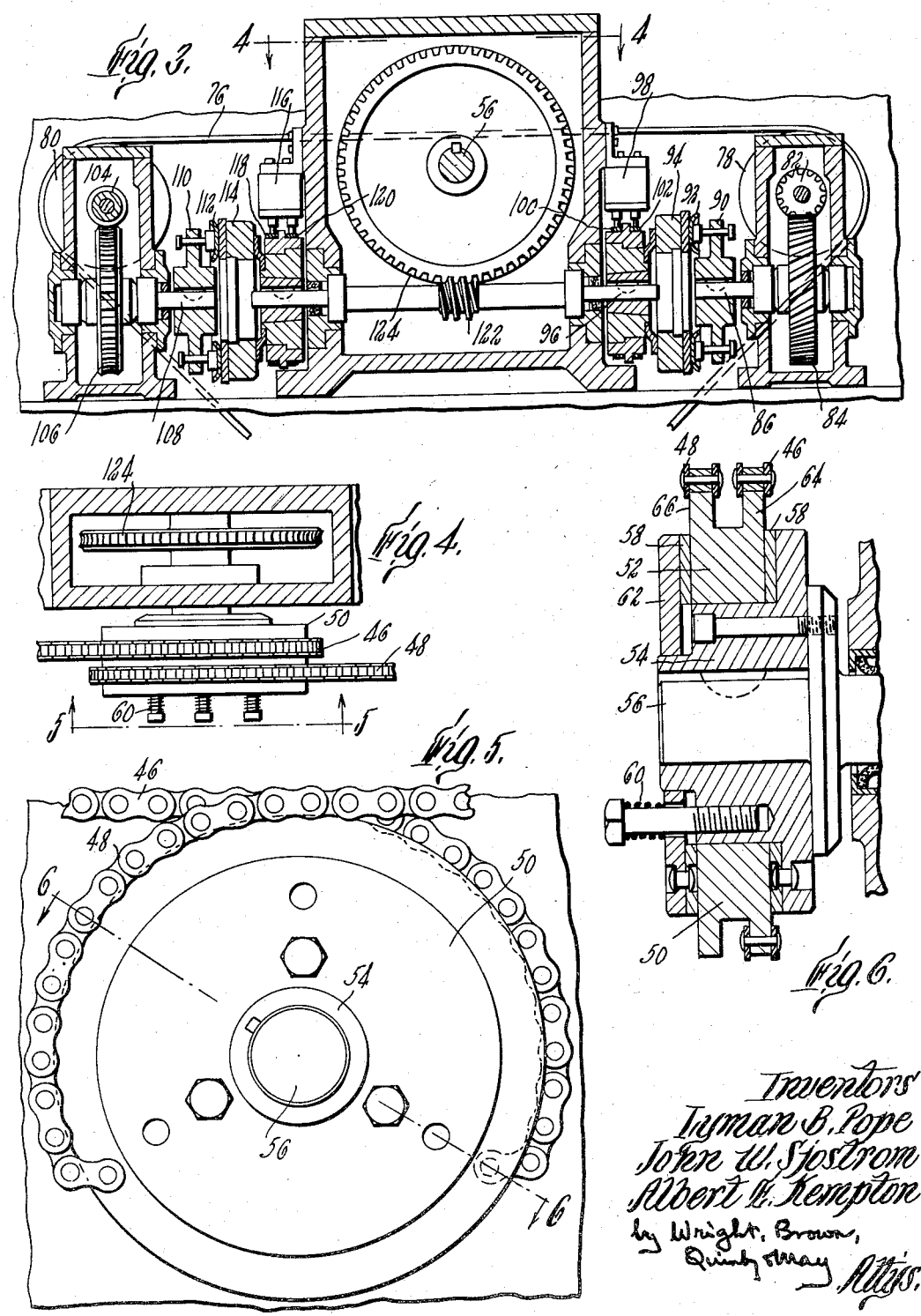

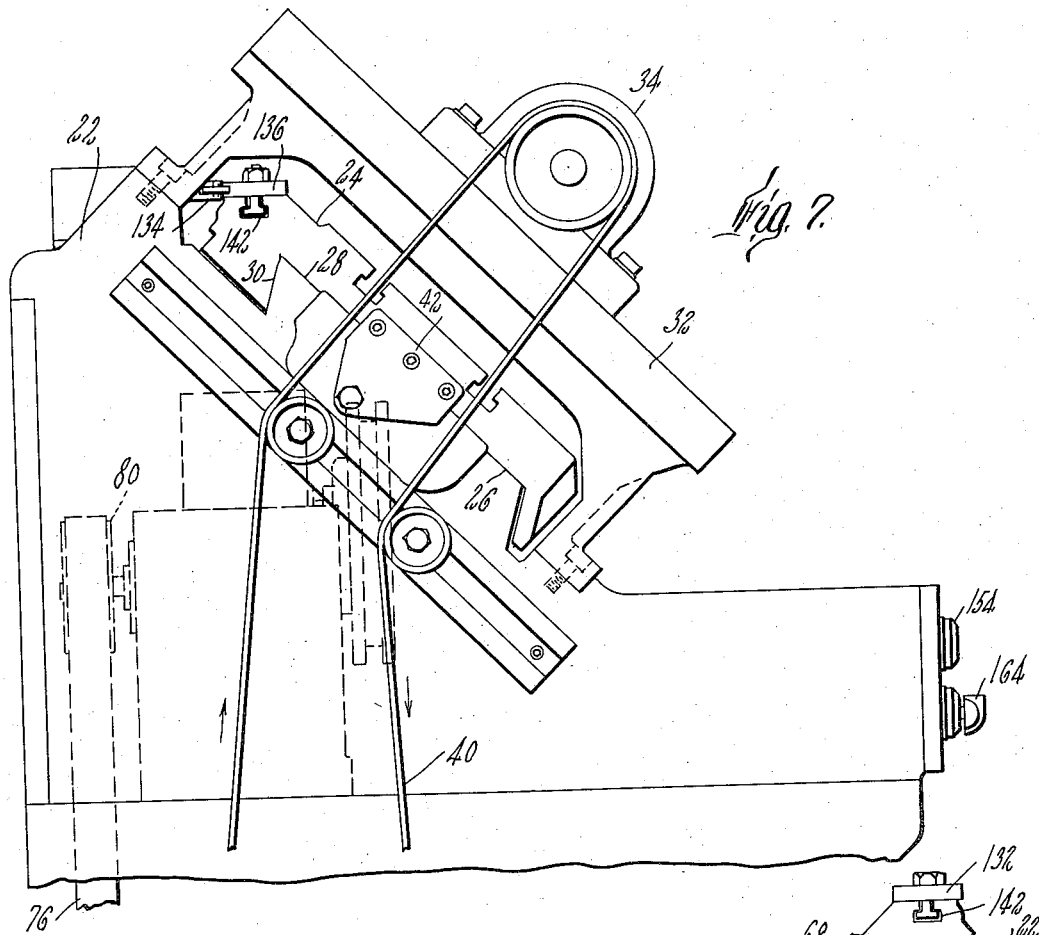
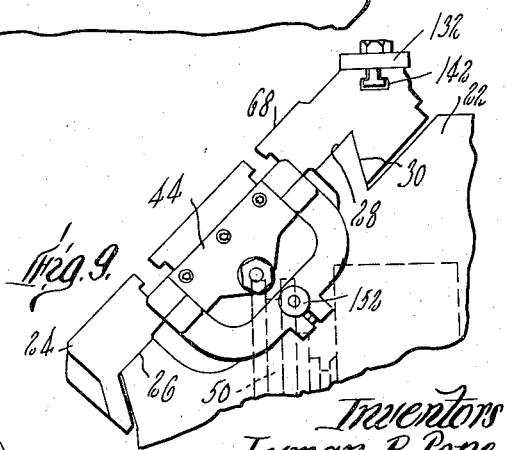
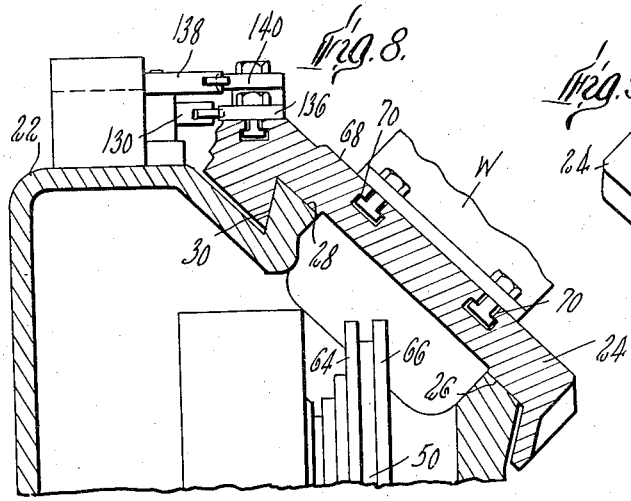

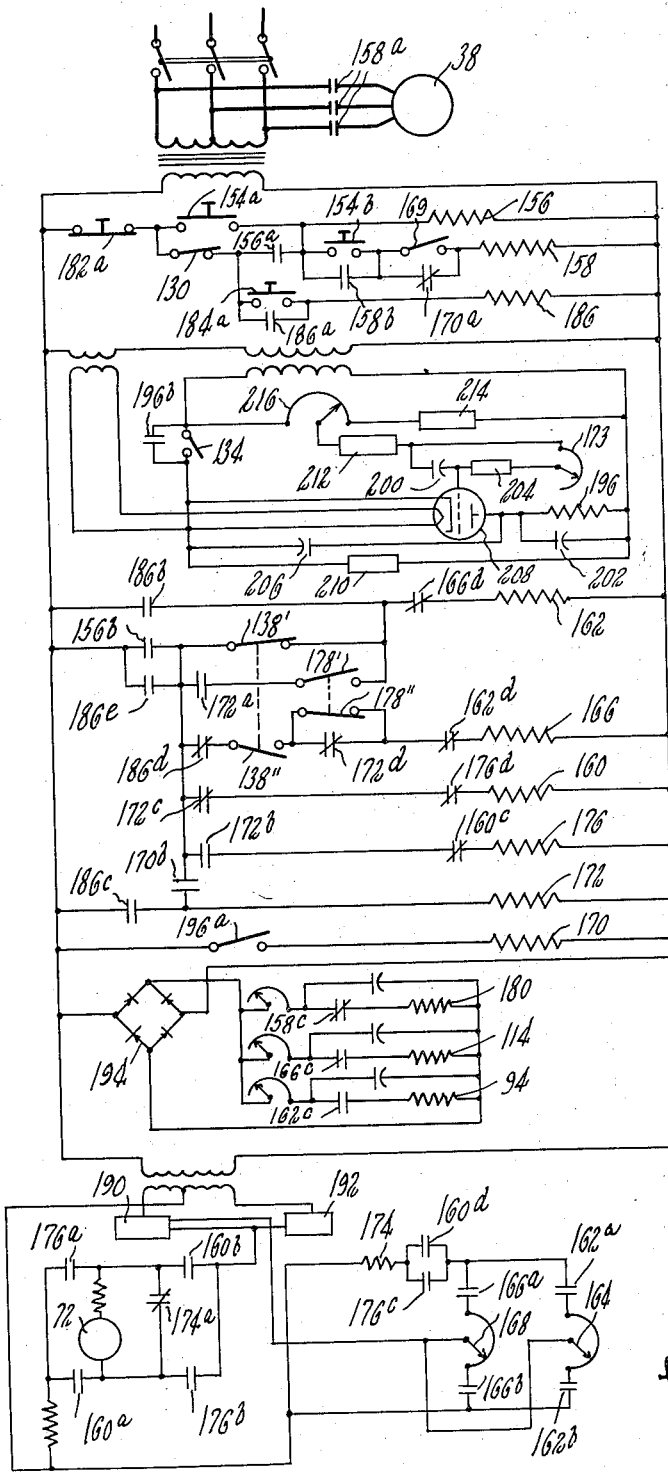

United States Patent Office 2,880,629
Patented Apr. 7, 1959

2,880,629

BORING MACHINE WORKTABLE AND SPEED CONTROL THEREFOR

Lyman B. Pope, Kingston, and John W. Sjostrom, Salem, N.H., and Albert E. Kempton, Andover, Mass., assignors to Pope Machinery Corporation, Haverhill, Mass., a corporation of Massachusetts Application December 19, 1955, Serial No. 553,768

2 Claims. (Cl. 77—3)

This invention relates to a worktable on a boring machine and means for controlling the traversing speed of the table. The boring machine hereinafter described includes means for rotating a tool such as a single point boring tool on a horizontal axis, and a worktable which is movable back and forth to advance the workpiece to the rotating tool and to retract it therefrom. For efficient operation of the machine provision must be made for different, controlled speeds of travel of the table during each cycle of operation. For example, the travel of the table to the point at which the work piece comes into contact with the tool should be rapid, to save time. The speed of advance should then change abruptly to the proper feeding speed of the operation which is being performed. In some cases it may be desirable to have two or more different successive feeding speeds if successive portions of a boring operation impose loads of different magnitudes on the spindle. At the conclusion of the operation, the work piece is withdrawn from the tool and rapid-returned to the loading position. These movements call for controls by which the table can be moved any desired speed in either direction up to the maximum possible. Hydraulic driving means for such tables have been employed but have been found to have several serious drawbacks in actual use. For example, it is difficult to avoid leakage. Furthermore, the liquid is apt to heat up and change its viscosity. This affects tolerances and the manner of operation of the machine. An object of the present invention is to provide a mechanical driving means which will have the flexibility of the hydraulic system without its objectionable features.

According to the invention, a mechanical-electrical mechanism is provided to drive the worktable at any speed within the limits of a sufficient speed range to meet the requirements of a boring machine. For this purpose a variable-speed, reversible, dynamically braked, electric motor is employed to drive the worktable, the motor being selectively connected to the table through speed-reduction transmission mechanisms of different ratios. Two such mechanisms have the effect of doubling the range of speed variation of the motor itself.

Another object of the invention is to provide a machine capable of cutting a work piece to a predetermined depth with an extraordinarily high degree of precision. As hereinafter described, this is done by providing a fixed stop element against which the work table presses when it reaches the end of its working stroke. The pressure is maintained for a brief but accurately measured interval of time by a frictional slip connection in the mechanism which drives the table, during which interval the tool performs a facing operation on the work. At the end of the interval, the motor which drives the table is reversed and the table is backed away from the stop.

The worktable is mounted with its plane inclined at an angle of 45°, its direction of travel being horizontal. This facilitates the operation of disposing of chips from the work and also facilitates loading and discharging workpieces by gravity.

For a more complete understanding of the invention, reference may be had to the following description thereof and to the drawings, of which—

Figure 3 is an enlarged sectional view on the line 3—3 of Figure 1;

Figure 4 is a section on the line 4—4 of Figure 3;

Figure 5 is a fragmentary elevational view of the mechanism shown in Figure 4, seen as indicated by the line 5—5 of Figure 4, but on a larger scale;

Figure 6 is a section on the line 6—6 of Figure 5;

Figure 7 is an end elevation of the upper portion of the machine shown in Figure 2, on a larger scale;

Figure 8 is an enlarged sectional view on the line 8—8 of Figure 1;

Figure 9 is a fragmentary enlarged end view of the upper part of the machine shown in Figure 2; and Figure 10 is a wiring diagram of the electrical system in the machine.

Figure 1:
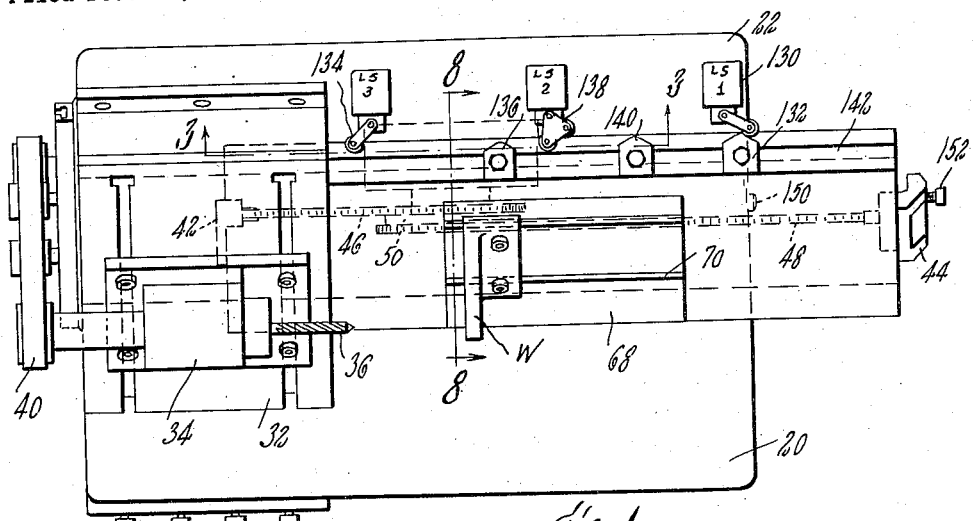
Figure 1 is a plan view of a boring machine embodying the invention.

The boring machine illustrated on the drawings comprises a bed 20 on which is a superstructure 22 including ways on which a table 24 slides horizontally to carry either a work piece or a tool. As shown, the table 24 is a worktable. The ways include three elongated bearing surfaces 26, 28 and 30. These surfaces extend horizontally but the surfaces 26 and 28 are in a common plane which is transversely inclined at an angle of 45° or so. The surface 30 is in a plane which is nearly vertical and which meets the plane of the surfaces 26 and 28 at an acute angle of a little over 45°. The table 24 has corresponding bearing surfaces which ride respectively on the surfaces 26, 28 and 30.

Mounted on the superstructure at the left hand end thereof (Figures 1 and 2) is a head comprising a bridge 32 under which a portion of the table 24 can slide (Figure 7) and either a tool holder or a work holder to cooperate with the table 24. As shown, a bearing 34 for a spindle which carries a tool 36 is adjustably mounted on the bridge. The spindle and tool are driven by a suitable motor 38 which is connected to the spindle by a belt 40 running on suitable pulleys.

The table 24 has brackets 42 and 44 at the ends thereof to which are respectively attached two flexible tension members 46 and 48. As shown, these tension members are chains which are virtually inextensible. The chains lead to a drum 50 (Figure 5) to which they are attached in such a manner that when the drum is rotated in one direction or the other, the table moves accordingly to the right or left. The drum 50 has a rim 52 (Figure 6) which is frictionally held by a hub member 54 keyed to a shaft 56. The rim 52 is pressed between friction rings 58 by springs 60 pressing against an annular disk 62 which in turn presses the rim 52 and rings 58 against a flange on the hub member 54. Thus the rim 52 ordinarily rotates as a unit with the hub member 54 but can slip thereon if the shaft 56 turns beyond the angular position of the hub corresponding to the arrival of the table 24 at one end of its travel. The chains 46 and 48 approach the drum from opposite directions and are sufficiently enwrapped about its circumference to allow for the travel of the table 24. As an end of each chain is secured to the drum, sprocket teeth are not provided on the drum. The chains engage respectively on two radial flanges 64 and 66, thus ensuring regular, even movement when the drum 50 is steadily rotated.

The central third 68 of the table 24 is raised or thickened for longitudinal T slots 70 (Figure 8) by which a work piece W is secured to the table so that movement of the table toward the left advances the work to the tool 36, and movement toward the right retracts the work from the tool. To save time in a boring operation it is desirable that the work, after being mounted on the table, be advanced rapidly by a traversing movement until it is nearly in contact with the tool. From then on it should be advanced by a slow feeding movement as the tool operates on it, the actual rate of the feeding movement depending on the particular job to be done. The return movement of the work to its loading position should also be rapid, at least that part of the return movement which takes place after the work is clear of the tool. An electric motor 72 is mounted in the bed to drive the table 24. This motor is reversible and is supplied with controls by which it can be made to operate in either direction at a speed which is infinitely variable from a very low speed up to its maximum. The motor 72 drives a pulley wheel 74 which is connected by a belt 76 to two pulley wheels 78 and 80. The pulley wheel 78 turns a spiral pinion 82 which meshes with a spiral gear wheel 84. The latter is mounted on a shaft 86 on which is also mounted a member 90 of a magnetic clutch. The member 90 carries a ring-shaped armature 92 adapted to be drawn against a series of electromagnets in a ring 94 which is mounted for rotation with a shaft 96. Current for exciting the magnets is supplied from a suitable source (Figure 10) through brushes carried by a support 98 and slip rings 100 and 102.

The pulley wheel 80 turns a worm 104 which meshes with a worm gear 106. The latter is mounted on a shaft 108 on which is also mounted a member 110 of a magnetic clutch. The member 110 carries a ring-shaped armature 112 adapted to be drawn against a series of electromagnets in a ring 114 which is mounted for rotation with the shaft 96. Current for exciting these magnets is supplied through brushes carried by a support 116 and slip-rings 118 and 120.

The ratio of the gears 82, 84 (e.g., 3 to 1) is adapted for a rapid or traversing drive of the shaft 96. The ratio of the gears 104, 106 (e.g., 60 to 1) is adapted for a relatively slow or feed drive of the shaft 96. By means of control switches hereinafter described, the clutches can be operated to change the table travel instantly from a traversing speed to a feeding speed, and vice versa. The shaft 96 carries a worm 122 which meshes with a worm gear 124 mounted on the shaft 56 and thus drives the table 24 through the chains 46 and 48. The actual rates of travel of the table will depend not only on the gear ratios heretofore mentioned but also on the pitch diameter of the chain drum 50, the diameters of the pulley wheels 74, 78 and 80, and the speed of rotation of the motor 72. For example, if the pulley wheels are all of the same size, the range of motor speeds is from 86 to 1725, and the pitch circumference of the chain drum is approximately 28", then the range of speeds of the table 24 connected to the motor 72 through the feed clutch 110 will be from about ½" per min. to slightly over 10" per min. The range of speeds of the table when connected to the motor 72 through the traverse clutch 90 will be from slightly less than 10" per min. to about 200" per min. These ranges overlap each other so that by suitably regulating the speed of the motor 72 and selecting either the feed or traverse transmission, any speed of travel from 0.5 to 200 inches per minute can be had for the table 24.

Figure 2:
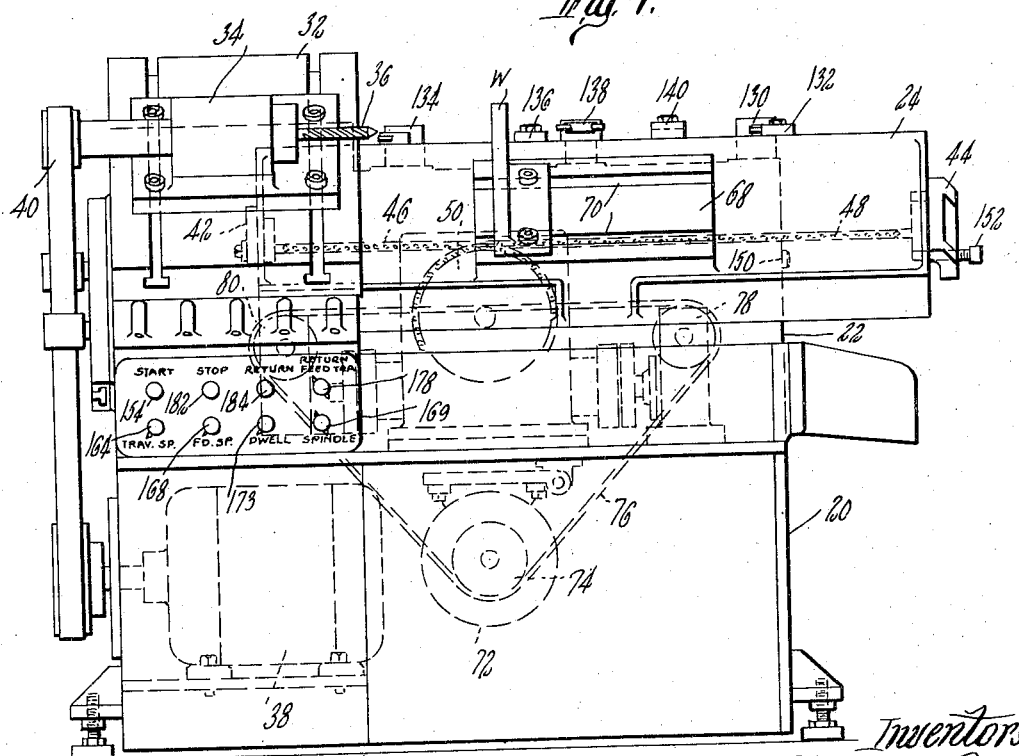
Figure 2 is a front elevation of the same.

For semi-automatic control of the movements of the table, any number of control switches are mounted on the bed or superstructure to be engaged by dogs on the table 24 as the latter travels toward and from the tool-bearing end of the bed. Three such switches are shown in Figures 1 and 2. These switches comprise a limit switch 130 engageable by a dog 132 to stop the table at the conclusion of its return stroke, a limit switch 134 engageable by a dog 136 to reverse the direction of movement of the table when it completes a working stroke, and an intermediate toggle switch 138 engageable by a dog 140 at a point in the working stroke of the table when the work piece is about to encounter the tool 36. When the dog throws this switch, the relatively rapid traversing speed of the table is abruptly changed to a much slower feeding movement. Additional intermediate switches may be mounted on the bed between the switch 138 and the limit switch 134 to provide for changes in the feeding speed for successive portions of the working stroke. During the reverse stroke of the table, the dog 140 trips the switch 138 back to its original position. If the mechanism has been set for initial return movement of the table at the feeding rate, this operation of the switch 138 changes the feeding speed to the traversing speed for the remainder of the return stroke of the table. If the mechanism has been set for the table to make its entire return stroke at traversing speed, the throwing of the switch 138 merely resets it for the next working stroke of the table. The intermediate dog 140 and the switch members engaged by it are not on the same level with the dogs 132 and 136 and the switch members engaged by them (Figure 2). Hence if the table travel carries the dog 132 or the dog 136 past the switch 138, this switch is not operated by either of these dogs. All of the dogs are adjustable along a key slot 142 to regulate the distances to be travelled by the table at traversing speed and at feeding speed or speeds during each working stroke, according to the size and shape of the work piece and the length of the tool employed.

As it is important in precision production that the end of the working stroke of the table be accurately determined, a stop element 150 is mounted on an end wall of the superstructure (Figure 1). A screw 152 is carried by the bracket 44 in line with the stop element 150. This provides an accurate, adjustable end position for the working stroke of the table 24.

The electrical part of the machine, hereinafter described, provides for considerable flexibility in the operation of the machine. When the workpiece has been secured in place on the table 24, a starting button 154 is pressed to start the motors 38 and 72. The latter ordinarily would be connected to the table 24 at this stage through the traverse clutch 90. Just before the work piece reaches the tool 36, the clutches 90 and 110 are automatically operated to change the travel of the table to a feed movement which continues until the table reaches the end of its working stroke (toward the left in Figures 1 and 2) and trips the reversing switch 134. The dog 136 is carefully adjusted to trip the switch 134 at the instant the screw 152 brings up against the stop element 150, but instead of an instant reversal of the table motor 72, a timing device is set in operation to interpose a brief but accurately predetermined delay or dwell between the arrival of the table at the end of its working stroke and the reversal of the motor 72 to start the table on its reverse stroke. The stop element 152 puts a precise and positive limit to the travel of the table and the work piece carried thereby, and it is desirable to hold the table at the end of its stroke for a brief interval to permit the tool to perform a facing operation by smoothing the cut surface. Although the table has been stopped, this facing operation results in a slight further advance of the tool into the work piece as the distortion of the work piece arising from its pressure against the tool is relieved. Hence, when a high degree of precision is sought, it is important that the dwells be of exactly the same duration for the successive work pieces so that the advance of the tool into the work pieces during the dwells will be uniform. As the table motor 72 continues its forward rotation during the dwell, the rim 52 slips on the hub member 54 until the motor stops and reverses to start the table on its travel in the reverse direction, either at traversing speed or at feeding speed as desired, and the spindle motor 38 either stops or continues to run according to the setting of the control knobs on the panel shown in Figure 2. To return the table to its initial position, the motor 72 is reversed and the appropriate clutch 90 or 110 is operated to drive the table at the desired speed. If the controls have been set for traversing speed on the return stroke, this speed is maintained during the entire stroke. If the controls are set to start the table on its return stroke at feeding speed, the tripping of the switch 138 by the dog 140 results in the disengaging of the feeding clutch 110 and the engaging of the traversing clutch 90 so that the remainder of the reverse stroke of the table is at traversing speed. When the dog 132 throws the switch 130, both motors are stopped and the traverse clutch is disengaged. The apparatus is then ready for the removal of the work piece from the table and the mounting of a fresh work piece thereon.

Electrical control apparatus by which the foregoing operations are brought about is indicated diagrammatically in Figure 10 of the drawings. When a work piece has been properly mounted on the table 24, the machine is started by pushing the button 154 which closes two starting switches 154a and 154b. The switch 154a closes a circuit through a relay coil 156 which closes two switches 156a and 156b, and a circuit through a relay coil 158 closes the spindle motor switch 158a, a holding switch 158b, and a brake control switch 158c for the spindle motor 38. The switch 156b closes circuits through relay coils 160 and 162. The coil 160 closes two table motor switches 160a and 160b to start the motor 72 in a direction to move the table 24 toward the left. The coil 160 also opens a normally closed switch 160c in a circuit controlling reverse operation of the motor 72, and closes a switch 160d in a dynamic braking circuit hereinafter described. The coil 162 closes three switches 162a, 162b and 162c, and opens a normally closed switch 162d. The switches 162a and 162b connect the motor 72 with a potentiometer 164 which includes a knob (Figure 2), for regulating the speed of the motor 72 when the latter is connected to the table through the traversing clutch. The switch 162c closes a circuit through the magnets in the clutch ring 94 which engages the traversing clutch (Figure 3).

As soon as the table starts to move toward the left, the dog 132 permits the switch 130 to close. Since the switches 156a and 156b were closed by the pressing of the starting button, the button can now be released without interrupting the circuit through the coils 156 and 158, and the table continues to advance.

When the dog 140 trips the switch 138 (which consists of a normally closed switch 138' and a normally open switch 138" mechanically connected so that when either is open the other is closed), the switch 138' opens, deenergizing the coil 162 so that the switch 162d in the feed relay circuit closes. At the same time, the switch 138" closes a circuit through the switch 162d and a relay coil 166. The latter closes three normally open switches 166a, 166b and 166c which connect a potentiometer 168 in the circuit of the motor 72 and engage the feeding clutch by energizing the magnets in the ring 114 thereof. The relay coil 166 also opens a normally closed switch 166d which is in series with the relay coil 162 to prevent any possible energization of the latter while the coil 166 is energized.

The table now travels toward the left at feeding speed the magnitude of which is regulated by adjustment of the potentiometer 168 which includes a convenient finger knob on the panel (Figure 2). When the table reaches the end of its working stroke, the dog 136 trips the switch 134 which starts the operation of a timing device, to cause a brief delay or dwell of exactly predetermined magnitude followed by the closing of switches which reverse the motor 72, the spindle motor continuing to run during the period of the dwell. The timing device, which per se is not part of the invention, operates to energize a relay coil 196 at the end of the dwell, the length of the dwell being regulated by turning a knob on the control panel (Figure 2) which is a part of a variable resistor 173. The energization of the coil 196 closes a normally open switch 196a and a holding switch 196b. The switch 196a closes a circuit through a relay coil 170 which when energized opens a switch 170a. This deenergizes the coil 158 and stops the spindle motor 38 unless a manual selector switch 169 has previously been closed to keep the spindle motor running. When the coil 158 is deenergized, the switch 158c closes, energizing a coil 180 which operates a braking mechanism (not shown) to stop the spindle motor 38 quickly.

The coil 170 also closes a switch 170b which energizes a coil 172, the switch 156b still being closed. The coil 172 closes switches 172a and 172b and opens switches 172c and 172d. The opening of the switch 172c deenergizes the coil 160, closing the switch 160c and opening the switches 160a, 160b and 160d so that forward rotation of the motor 72 stops. For quick stopping of this motor dynamic braking is employed by the use of a circuit containing a switch 174a which is closed to short-circuit the armature windings except when held open by a coil 174 which is energized only while current is being supplied to the motor for forward or reverse operation.

The closing of the switch 172b energizes a relay coil 176, the switch 160c now being closed. This closes three switches 176a, 176b and 176c and supplies current to the table motor 72 for operation in the reverse direction. The coil 176 also opens a normally closed switch 176d in the circuit containing the coil 160 which thus cannot be energized while the motor 72 is running in the reverse direction.

The first part of the reverse movement of the table 24 may be at feeding speed or traversing speed as desired. The selection is had by manipulation of a double switch 178' and 178" manually operable by a knob 178. These switches are mechanically connected so that when either is open the other is closed. If the initial part of the return stroke of the table is to be at feeding speed, the switch 178" remains closed as shown in Figure 10. If the entire return stroke of the table is to be at traversing speed, the knob 178 is set so that the switch 178' is closed. When the table starts on its return stroke, the switch 138" is closed. If the switch 178" is also closed, the coil 166 continues to be energized and the feed clutch 110 remains engaged. As soon as the dog 136 trips the switch 138 on the reverse stroke, the switch 138" opens and the coil 166 is deenergized, opening the switch 166c to disengage the feeding clutch 110, and closing the switch 166d to cause the traverse clutch 90 to engage as hereinbefore described.

If the table is to travel at traversing speed through all of the return stroke, the knob 178 is turned to close the switch 178' and open the switch 178". Then when the coil 172 is energized to close the switch 172a and to open the switch 172d, the coil 166 is deenergized, disengaging the feeding clutch 110, and the coil 162 is energized, causing the traverse clutch 90 to engage. The shifting of the switch 138 by the dog 136 during the reverse stroke of the table does not change this set-up as the coil 166 is locked out by the open switch 162d.

When the table 24 reaches the end of its return stroke, the dog 132 opens the switch 130, deenergizing the coil 156. This opens the switch 156a, deenergizing the coil 158 and stopping the spindle motor 38. The switch 156b also opens, stopping the motor 72. When the work piece has been removed from the table and a fresh one mounted thereon, the mechanism is ready for the next cycle to be started by pushing the starting button 154.

For rapid stopping of the spindle motor 38, a braking mechanism (not shown) is employed, this brake being represented by a coil 180 in series with a switch 158c which is closed except when the coil 158 is energized. Thus when the circuit through the coil 158 is opened, the deenergization of this coil simultaneously opens the switch 158a and closes the switch 158c. The latter energizes the coil 180 and applies the brake to the spindle motor 38.

The table and spindle motors can be stopped at any time by pressing a stop button 182 which opens a switch 182a. This operates the relays in the manner described as when the limit switch 130 opens.

If reverse movement of the table is desired at any time during its working stroke, a button 184 can be pressed to close a normally open switch 184a. This energizes a coil 186 which closes a holding switch 186a, three other normally open switches 186b, 186c, and 186e, and opens one normally closed switch 186d. The closing of the switch 186c energizes the coil 172 which results in the reversal of the table travel as hereinbefore described. The closing of the switch 186b or 186e energizes the coil 162 so that the resultant reverse travel of the table is at traversing speed. The opening of switch 186d interlocks coil 166.

As shown on the drawings the spindle motor 38 is a unidirectional three-phase motor; the table motor is a reversible direct-current motor the current for which is supplied through suitable electronic rectifying tubes 190 and 192. Direct current for operation of the spindle motor brake and the magnetic clutches 94 and 114 is supplied through a rectifier 194.

The electronic timing device for producing a brief dwell of predetermined duration between the tripping of the switch 134 and the reversing of the table motor 72 is a known article of commerce and comprises primarily a condenser 200 which starts to build up a charge when the swittch 134 is closed. When the charge reaches a predetermined magnitude the condenser discharges and energizes the coil 196 with results hereinbefore described. The critical magnitude of the charge and hence the time interval required for the accumulation of the charge can be varied within a limited range by adjusting the variable resistor 173, a knob for which is provided on the control panel. Different ranges of adjustment can be had by replacing condensers 200 and 202, resistor 204 and the variable resistor 173 with units having other ratings. The timer also includes a condenser 206, a vacuum tube 208, resistors 210, 212 and 214, and a potentiometer 216 connected as shown.

With the apparatus described, the operation of the machine including the regulation of the speeds of travel of the table in either direction, can be adequately controlled by manipulation of the buttons and knobs on the control panel.

This application is a continuation-in-part of our copending application, Serial No. 487,624, filed February 11, 1955, and later abandoned.

We claim:

1. A boring machine comprising a base, a tool spindle rotatably mounted on said base, a work table movable on said base toward and from said spindle, a reversable motor for driving said table, means operatively connecting said table to said motor, said means including a shaft rotatably carried by said base, parts of two clutches mounted on said shaft, complemental clutch parts adapted to engage the corresponding clutch part on said shaft to different gear trains connecting said motor to said complemental clutch parts respectively whereby said motor drives said complemental clutch parts at different speeds, means including a friction element operatively connecting said shaft to said table, means automatically operating to disconnect one said clutch and connect the other said clutch at a predetermined intermediate point in the travel of said table toward said spindle, a positive stop member on said base engageable by said table to limit the approach thereof to said spindle, means operating automatically when said table engages said stop to reverse said motor after a brief time interval, and adjustable control means for predetermining the duration of said interval.

2. A boring machine as in claim 1, and control means capable of being set to determine in advance the speeds of travel of said table before and after it reaches said intermediate point in its travel toward said spindle.

References Cited in the file of this patent

UNITED STATES PATENTS

| | | |
|---|---|---|
| 1,166,974 | De Leeuw | Jan. 4, 1916 |
| 1,340,811 | Ballman | May 18, 1920 |
| 2,481,383 | Bickel et al. | Sept. 6, 1949 |
| 2,495,312 | Bickel et a. | Jan. 24, 1950 |
| 2,677,923 | Parker | May 11, 1954 |